United States Patent [19]
Heckenkamp et al.

[11] 3,917,474
[45] Nov. 4, 1975

[54] RECEIVER-SEPARATOR UNIT FOR LIQUID INJECTED GAS COMPRESSOR

[75] Inventors: Frederick William Heckenkamp; Francis M. Wensing, both of Quincy, Ill.

[73] Assignee: Gardner-Denver Company, Dallas, Tex.

[22] Filed: Sept. 9, 1974

[21] Appl. No.: 504,411

[52] U.S. Cl. ............... 55/332; 55/185; 55/385; 55/195; 55/330
[51] Int. Cl.² ............................................ B01D 50/00
[58] Field of Search ............ 55/185, 187, 188, 318, 55/319, 320, 329, 330, 332, 333, 337, 413, 414, 426, 465, DIG. 23, 385, 183, 186, 261, 262, 189, 195

[56] References Cited
UNITED STATES PATENTS

| | | | |
|---|---|---|---|
| 1,722,870 | 7/1929 | Waters | 55/413 |
| 1,938,849 | 12/1933 | Maxim et al. | 55/426 |
| 2,440,860 | 5/1948 | Kalmeyer | 55/319 X |
| 2,765,870 | 10/1956 | Campbell | 55/426 X |
| 2,859,832 | 11/1958 | Lankenau | 55/426 |
| 2,933,152 | 4/1960 | Carpenter et al. | 55/319 |
| 2,970,671 | 2/1961 | Warner | 55/330 X |
| 3,324,634 | 6/1967 | Brahler et al. | 55/DIG. 23 |
| 3,499,270 | 3/1970 | Paugh | 55/459 |
| 3,606,737 | 9/1971 | Lefevre | 55/319 |

FOREIGN PATENTS OR APPLICATIONS

| | | | |
|---|---|---|---|
| 823,960 | 9/1936 | France | 55/320 |

*Primary Examiner*—Frank W. Lutter
*Assistant Examiner*—David L. Lacey
*Attorney, Agent, or Firm*—Michael E. Martin

[57] ABSTRACT

A receiver-separator tank for a liquid injected gas compressor system having a first compartment characterized by a horizontal elongate tank portion and a second compartment formed by an integral upstanding tower section in which is disposed an annular impingement type liquid separator element. The separator element is supported on a transverse end wall disposed across the bottom of the tower section, the end wall having a central opening for admitting a gas-liquid mixture to the interior of the separator element. The tower section has a removable top head for providing access to the interior of the tower section for inspection and replacement of the separator element. The final gas discharge conduit and ancillary openings and conduits are connected to the side wall of the tower section or the horizontal tank portion. A pan disposed below the bottom wall of the tower section forms a baffle to reduce the liquid separation load imposed on the separator element.

3 Claims, 5 Drawing Figures

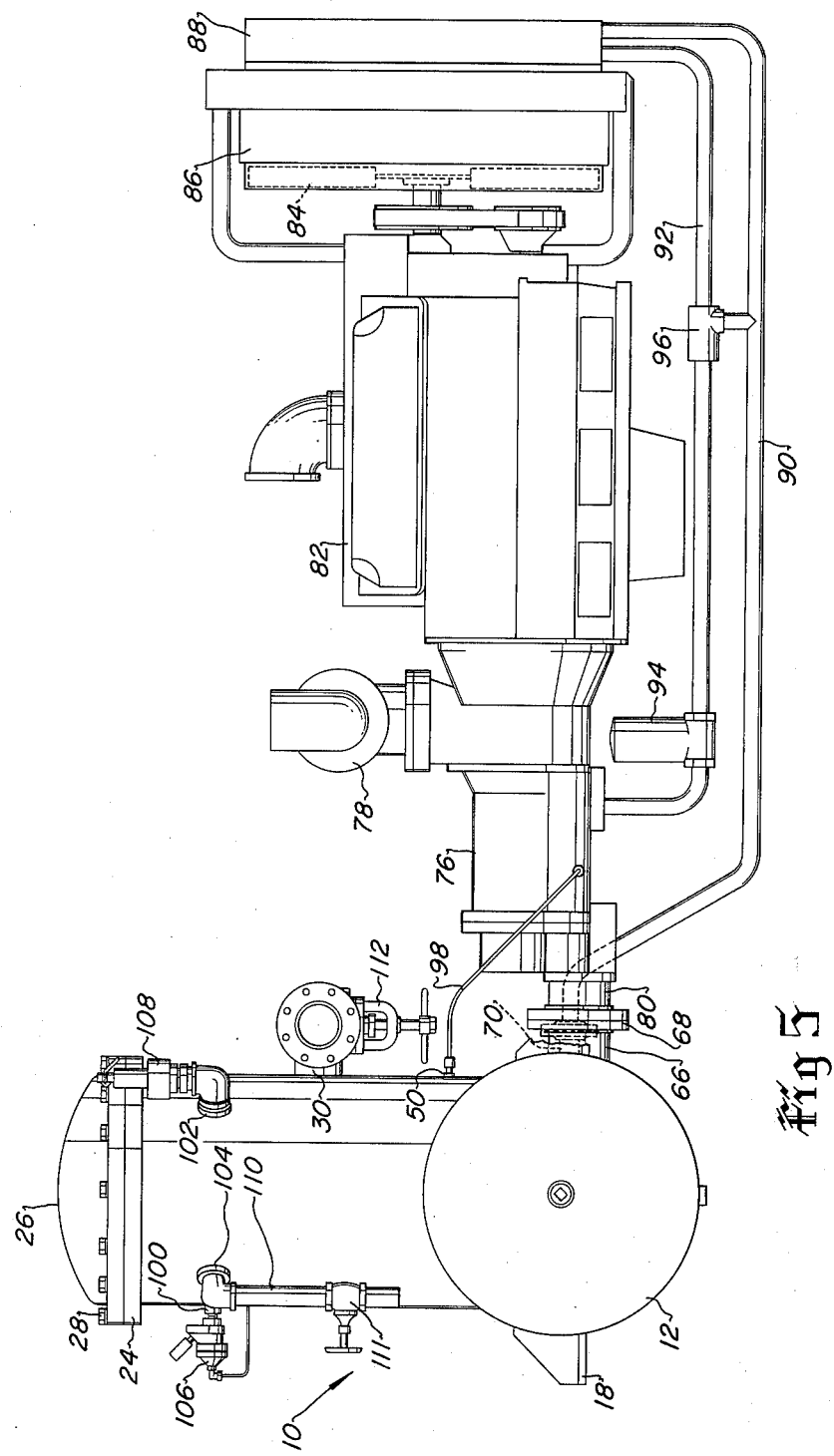

RECEIVER-SEPARATOR UNIT FOR LIQUID INJECTED GAS COMPRESSOR

BACKGROUND OF THE INVENTION

Liquid injected gas compressor systems are usually characterized by a combined compressed gas receiver and liquid storage tank connected to the compressor discharge conduit for receiving the gas-liquid mixture discharged from the compressor proper. Prior art systems are known in which the receiver tank is provided with various means for separating liquid from the gas flow stream including removable impingement type separator elements or filters.

The separator element is usually disposed for removal from the separator tank by first removing a head or cover member of the tank proper. Conventional separator elements are disposed for receiving the gas-liquid mixture in a somewhat radial inwardly directed flow path whereby the final liquid-free gas discharge flow is taken from the interior of the separator by way of conduits connected to openings in the head or cover member. Such arrangements preclude convenient and quick removal and replacement of the separator element due to the necessity of first disconnecting all conduits fastened to the cover member itself.

The extensive use of liquid injected gas compressor systems has resulted in a number of inventions in receiver-separator devices such as disclosed in U.S. Pat. Nos. 3,499,270 to F. E. Paugh and 3,766,720 to C. Bloom. Generally, prior art receiver-separators have become somewhat complicated and expensive to fabricate due to the desire to make such devices as compact as possible while achieving maximum liquid separation capability. The present invention is considered to be an improvement in the art of receiver-separator units whereby effective liquid separation is accomplished with a relatively uncomplicated tank structure, and there is also provided a more easily serviceable unit.

SUMMARY OF THE INVENTION

The present invention provides an improved compressed gas receiver and liquid separator unit for liquid injected gas compressor systems wherein an impingement type separator element disposed in the receiver tank may be easily removed and serviced without disconnecting the gas discharge conduits from the receiver tank itself. By providing a receiver-separator tank adapted to introduce the gas liquid mixture into the interior of an annular separator element for radial outward flow of liquid-free gas, the final gas discharge opening from the separator tank may be conveniently located on the sidewall of the tower section so as to reduce the overall height of the receiver-separator tank.

Moreover, by providing for fluid flow from the interior of the annular separator element to the exterior thereof any differential pressure created by such flow results in a higher pressure acting on the inner walls of the separator element thereby eliminating the tendency for the separator element to be collapsed or crushed by inwardly directed unbalanced pressure forces.

The present invention further provides for an improved receiver-separator tank construction in which a structurally simple but effective baffle arrangement is provided which reduces the amount of liquid required to be separated by the final separation stage defined by the impingement type separator element.

The present invention also provides for a receiver-separator unit which is simple in construction and highly efficient in operation as a gas-liquid separator.

BRIEF DESCRIPTION OF THE DRAWINGS

FIG. 5 is a schematic view of a compressor system including the receiver-separator tank of the present invention.

DESCRIPTION OF THE PREFERRED EMBODIMENTS

Figure 2:
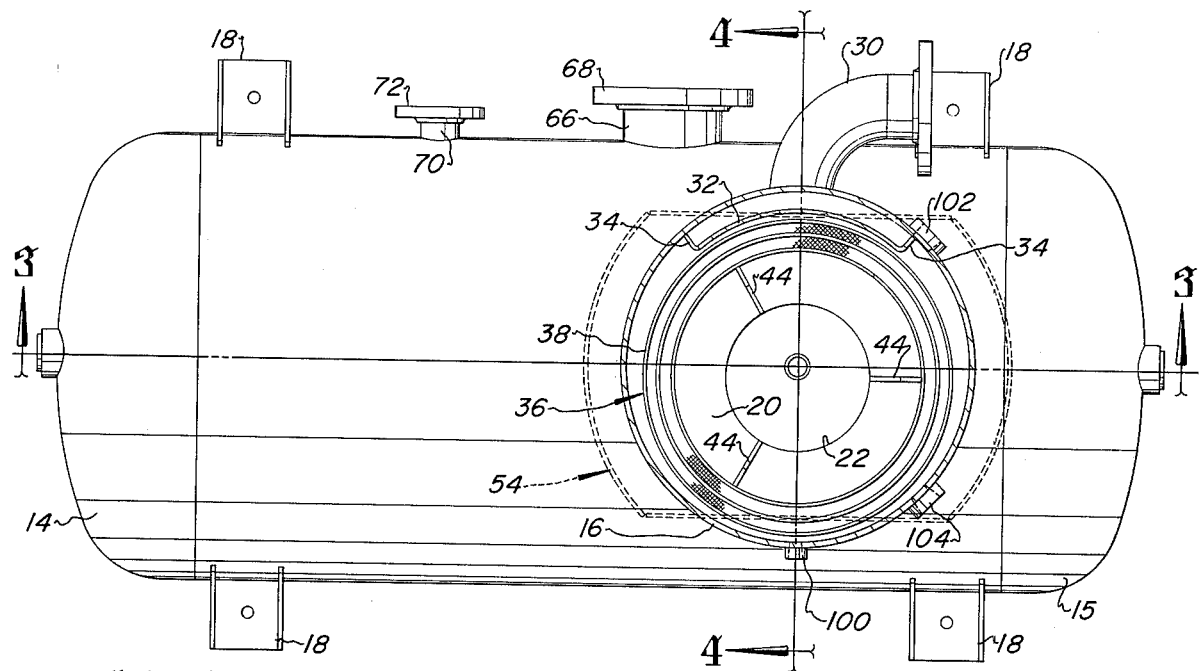
FIG. 2 is plan view taken from the line 2—2 of FIG. 3.

Referring to FIGS. 1 through 4 the receiver-separator unit of the present invention comprises a pressure vessel or tank generally designated by the numeral 10. The tank 10 includes a horizontal elongated tank portion 12 which is generally cylindrical in shape and has closed ends 14 and 15. The tank portion 12 forms a reservoir for liquid being circulated through the tank 10. The receiver-separator tank 10 is also characterized by a vertical tower section 16 formed to be integral with the tank portion 12. The tank portions 12 and 16 as well as the ends 14 and 15 may be suitably fabricated of steel and joined together by welding to form an integral unit. Suitable mounting brackets 18 are welded to the tank portion 12 for mounting the unit on a frame or chassis of a stationary or portable compressor apparatus to be described in more detail herein.

Figure 3:
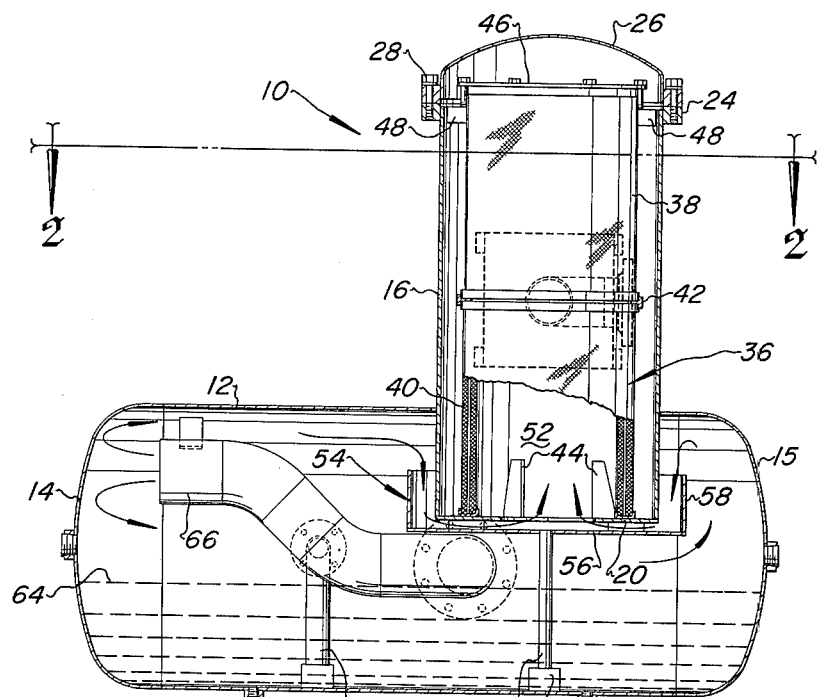
FIG. 3 is a section view taken from the line 3—3 of FIG. 2.
Figure 4:
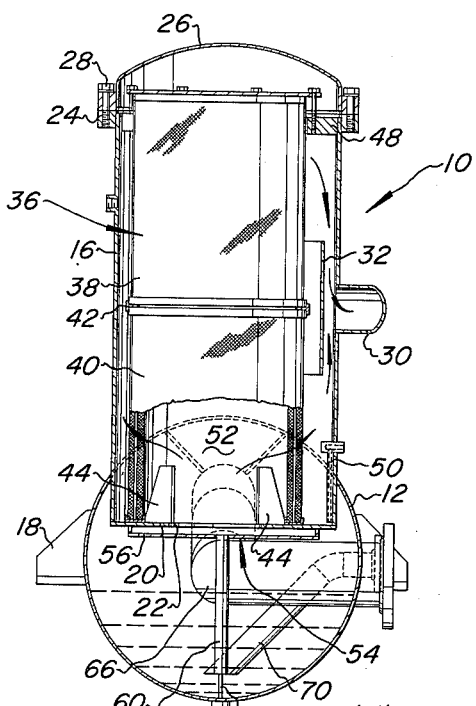
FIG. 4 is a section view taken from the line 4—4 of FIG. 2.

Referring particularly to FIGS. 3 and 4 it may be noted that the cylindrical wall of the tower section 16 extends downwardly into the interior of the tank portion 12. A transverse bottom plate 20 is disposed across the lower end of the tower section 16 and includes a generally central opening 22. The bottom plate 20 generally serves as a partition which divides the tank 10 into first and second compartments formed by the tank portion 12 and the tower section 16, respectively. The upper end of the tower section 16 includes a circular flange 24 adapted to receive a removable flanged cover member or head 26 which is sealably joined to the flange 24 by bolts 28. A gas discharge conduit 30 is disposed on the side wall of the tower section 16 and opens into the interior thereof for conducting substantially liquid-free compressed gas from the receiver-separator tank 10.

A baffle, formed by a curved plate member 32, is disposed on and spaced from the inside wall of the tower section 16 in front of the opening formed by the conduit 30. The baffle 32 includes integrally formed legs 34 which are suitably secured to the inside wall of the tower section 16 and thereby provide for the spaced relationship between the side wall of the tower section and the baffle itself to permit flow of liquid-free gas from the interior of the tower section 16 into the conduit 30.

The receiver-separator tank 10 includes a removable separator element 36 which is formed as an elongated tubular member made of a suitable porous or sievelike material. The element 36 may be made of plural layers of wire mesh or similar material adapted in such a way that particles of liquid will adhere thereto as a gas-liquid mixture comprising a relatively fine mist of liquid flows through the element from the interior space 52 to the annular space formed between the outside surface of the element 36 and the inside wall of the tower section. The separator element 36 is of a known type and may be formed in two sections 38 and 40 mounted one on top of the other and secured together by a suitable bracket or collar 42 as shown in FIG. 3. The separator element 36 is positioned in the tower section 16 by guides 44 mounted on the transverse bottom plate 20. As may be noted in FIG. 2 the element 36 is not centered in the interior cylindrical space formed by the tower section 16 but is somewhat eccentrically disposed therein. The element 36 is sealingly clamped against the bottom plate by a cover member 46 which is disposed across the top end of the element and is secured by bolts to tabs 48 projecting radially inwardly from the inside wall of the tower section 16. In a known way, as the gas stream flows through the element 36, fine drops of liquid gather on the element itself and coalesce into larger drops which flow downwardly to the surface of the bottom plate 20. Moreover, the baffle 32, disposed over the opening formed by conduit 30, prevents the flow velocity of the gas passing through the element 36 from becoming excessive in the vicinity of the opening and thereby causing liquid to be carried on through the element.

It is necessary to drain the liquid which accumulates on the bottom plate 20 in the annular space between the outside surface of the separator element 40 and the inside wall of the tower section 16 to prevent a build-up therein which would eventually clog at least a portion of the separator element and hinder its intended function. As shown in FIG. 4 a conduit 50 is disposed along the inside wall of the tower section 16 and opens through the wall of the tower section to the exterior thereof. The conduit 50 may be suitably connected to further conduit means leadidng to an appropriate point within the compressor system which is normally at a lower pressure than the pressure in the receiver separator tank 10 thereby providing for flow of liquid which has accumulated on plate 20 out of the tower section by way of the conduit.

Compressed gas flowing through the separator element 36 normally undergoes a slight drop in pressure depending on the rate of usage of gas or whatever flow restrictions may exist downstream of the discharge conduit 30. Accordingly, since the pressure in the space between the outside surface of the element 36 and the inside wall of the tower section 16 is at a pressure lower than the interior space 52 within the separator element there is no tendency for the liquid accumulating in the bottom of the tower section 16 to flow back through the separator element and mix with the incoming gas-liquid mixture flowing upward into the space 52 through the opening 22. Moreover, with the separator element arrangement in accordance with the present invention the occurrence of relatively large and rapidly changing pressure differentials across the separator element, such as might be caused by rapid opening of a valve downstream of the separator tank, do not tend to cause collapse or crushing of the element itself. This is due to the fact that the greater pressure in the space 52 keeps the rather frail ringlike structure of the separator element stressed in tension, a condition which the element itself is better able to withstand without experiencing structural failure.

Figure 1:
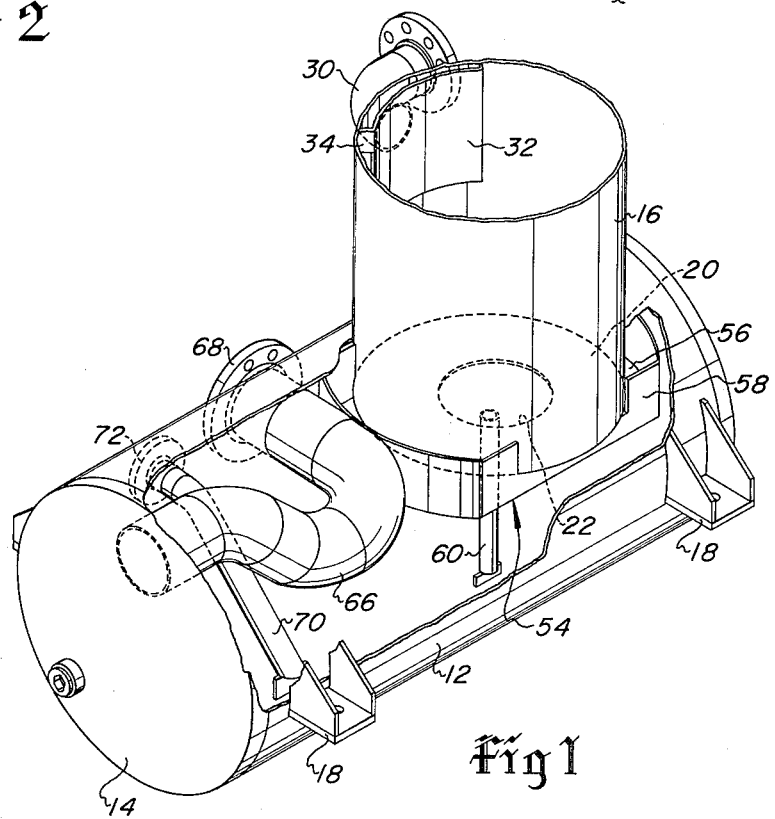
FIG. 1 is a perspective view partially cut away showing some of the structural features of the receiver-separator tank of the present invention.

The receiver-separator tank 10 also includes improved structure for enhancing the separation of liquid from the gas-liquid flow stream prior to entry into the space 52. The lower end of the tower section 16 includes a baffle formed by a generally pan shaped element 54 having a transverse bottom part 56 surrounded by a vertical side wall 58. As shown in FIG. 1 the side wall 58 is partially cut away to position the bottom part 56 spaced from but directly below the transverse plate 20. The baffle 54 may be fixed to the lower end of the tower section 16 in a suitable manner such as by welding. A liquid drain tube 60 opens into the interior of the pan shaped baffle 54 for draining liquid which collects therein. The tube 60 extends downwardly and is supported at its lower end by a bracket 62. The lower end of the tube 60 is below the normal liquid level in the tank portion 12 which level is indicated at 64 in FIG. 3. Accordingly, the gas-liquid mixture flowing through the receiver-separator tank must flow generally over the top of the side wall 58 then downwardly below the bottom plate 20 and finally in reverse direction up, through the opening 22. In this way the flowing stream of gas with liquid entrained therein undergoes a reversal in flow direction which tends to separate the heavier particles of liquid which then collect in the pan shaped baffle 54 and drain into the tank through tube 60.

The separator tank 10 is also provided with an inlet conduit 66 opening from a flanged connection 68 through the side wall of the tank portion 12 and curved to discharge the gas-liquid mixture against the end 14. The outlet of the conduit 66 is also positioned above the normal level of liquid in the tank. By directing the incoming gas flow stream, heavily laden with liquid, against the end 14 which is remote from the tower section 16 a major portion of the liquid is separated from the gas due to impingement against the tank end and due to a rapid change in direction of flow as the flow mixture enters the tank and flows toward the baffle 54.

The separator tank 10 is further provided with a conduit 70 which has one end positioned near the bottom of the tank portion 12 and an outlet flange 72 exterior of the tank and above the normal liquid level in the tank. The conduit 70 is for conducting separated liquid from the tank 10 through a suitable filter and heat exchanger prior to reinjection into the compressor.

In accordance with the foregoing description it may be understood that the receiver-separator tank 10 is particularly suited for use in oil injected air compressor system. Normally, in such systems copious quantities of oil are injected directly into the compression chamber of the compressor proper and a pressurized oil-air mixture is discharged into the receiver separator tank by way of the conduit 66. As previously mentioned a major portion of the oil entrained in the flow entering the separator tank is separated by the initial change in direction upon impinging against the end 14 and due to the effect of gravity as the flow velocity decreases. Oil remaining entrained is also separated as the air flows around the baffle 54 and enters the interior space 52. Final separation of fine droplets or oil mist is accomplished as the compressed air flow stream passes through the separator element 36.

Referring to FIG. 5 the receiver-separator tank 10 is shown in a compressor system including a compressor 76 of the positive displacement rotary type. The compressor 76 includes an air intake valve 78 and a discharge line 80 connected to the conduit 66 at the flange 68. The compressor 76 is drivenly connected to a prime mover such as an internal combustion engine 82 having a cooling fan 84 and a radiator 86. The compressor system of FIG. 5 also includes an oil cooler 88 mounted to have ambient air drawn thereover by the fan 84. A conduit 90 leads to the oiler cooler 88 from the oil drain conduit 70 of the tank 10. A conduit 92 leads from the oil cooler 88 to a filter 94 and then to the compressor 76 for conducting oil to be injected into the compressor in a known way. A temperature responsive valve 96 is provided in the oil flow circuit for by-passing at least a portion of the oil flowing from the tank 10 directly to the compressor 76 to maintain a uniform temperature of the oil being reinjected therein. A conduit 98 is connected to the conduit 50 for draining oil from the tower section 16. In the system shown in FIG. 5 oil circulation from the tank 10 back to the compressor 76 is accomplished due to the pressure differential which normally exists between the tank and the place of injection into the compressor proper. The system might also, of course, include a pump interposed in the conduit 90 or 92 for pumping oil through to the compressor 76.

As may be noted from FIG. 2 and FIG. 5 the receiver-separator tank 10 includes a plurality of ancillary openings through the wall of the tower section 16 formed by bosses 100, 102 and 104. For example, a pressure responsive control device 106 is connected to the boss 100. An overpressure valve 108 is connected to the boss 102 and a conduit 110 is connected to the boss 104 and may include a manually operable valve 111 for relieving the pressure in the tank 10. A manually operated valve 112 is shown connected to the discharge conduit 30 in FIG. 5. As may also be noted from FIG. 5 all fluid conduits are connected to the tank 10 on either the tower section 16 or the horizontal tank portion 12. Therefore, the head 26 may be easily removed for gaining access to the separator element without disconnecting any of the conduits which need to be in communication with the receiver-separator tank.

What is claimed is:

1. A receiver-separator tank for a liquid injected gas compressor system comprising:
    an elongated tank portion forming a first compartment and comprising a liquid reservoir;
    a conduit extending into said portion for conducting a gas-liquid mixture into said first compartment;
    a section of said tank forming a second compartment and comprising a vertically disposed cylindrical section formed integral with said elongated tank portion and including a side wall portion extending into said elongated tank portion;
    a partition between said first and second compartments formed by a transverse plate disposed across the lower end of said tower section which is disposed in said elongated tank portion;
    an opening in said plate for admitting a gas-liquid mixture to said second compartment;
    an outlet conduit disposed on the side wall of said tower section above said elongated tank portion and connected to said second compartment;
    liquid separator means comprising a hollow cylindrical element having a porous wall structure and disposed in said second compartment to have one end in sealing engagement with said plate and surrounding said opening;
    means forming a closure for the end of said element opposite said one end;
    said element defining an interior space for receiving a gas-liquid mixture through said opening whereby said mixture flows generally outwardly through said element for separation of liquid from said mixture and whereby substantially liquid-free gas then exits said second compartment through said outlet conduit;
    a head closing the end of said tower section opposite said lower end, said head being removably attached to said tower section for providing access to said element for removal of said element from said tower section; and,
    a generally pan shaped baffle including a bottom part disposed in spaced apart relationship with respect to said plate and below said plate, said baffle including a side wall extending upwardly from said bottom part, said baffle being positioned with respect to said opening in said plate so as to require substantially a reversal in flow direction of the gas liquid mixture passing from said first compartment to said second compartment.

2. The invention set forth in claim 1 together with: conduit means extending through said bottom part to the interior of said baffle formed by said bottom part and said side wall of said baffle, said conduit means extending downwardly from said bottom part for draining liquid from the interior of said baffle.

3. A receiver-separator tank for a liquid injected gas compressor system comprising:
    an elongated tank portion forming a first compartment and comprising a liquid reservoir;
    a conduit extending into said tank portion for conducting a gas-liquid mixture into said first compartment;
    a section of said tank comprising a vertically disposed cylindrical tower the interior of which forms a second compartment, said tower including a side wall extending into said elongated tank portion;
    a partition between said first and second compartments formed by a transverse plate formed across the lower end of said tower and in said elongated tank portion;
    an opening in said plate for admitting a gas-liquid mixture to said second compartment;
    an outlet conduit disposed on the side wall of said tower section above said elongated tank portion and connected to said second compartment.
    liquid separator means comprising an element having a porous wall structure and disposed in said second compartment in such a way that said mixture flows through said opening and then through said element for separation of liquid from said mixture whereby substantially liquid free gas then exits said second compartment through said outlet conduit;
    a head closing the end of said tower opposite said lower end, said head being removably attached to said tower for providing access to said element for removal of said element from said tower; and
    a baffle including a bottom part disposed in spaced apart relationship with respect to said plate and below said plate, said baffle including a side wall extending around said bottom part and upwardly from said bottom part, said baffle being positioned with respect to said opening in said plate so as to require substantially a reversal in flow direction of the gas-liquid mixture passing from said first compartment to said second compartment.

* * * * *